United States Patent
Choi et al.

(10) Patent No.: US 7,977,810 B2
(45) Date of Patent: Jul. 12, 2011

(54) SIGNAL COUPLING APPARATUS FOR POWER LINE COMMUNICATIONS USING A THREE-PHASE FOUR-WIRE POWER LINE

(75) Inventors: Sung Soo Choi, KyungGy-Do (KR); Jae Jo Lee, Seoul (KR); Kwan-Ho Kim, Seoul (KR)

(73) Assignee: Korea Electro Technology Research Institute (KR)

( * ) Notice: Subject to any disclaimer, the term of this patent is extended or adjusted under 35 U.S.C. 154(b) by 229 days.

(21) Appl. No.: 12/275,596

(22) Filed: Nov. 21, 2008

(65) Prior Publication Data
US 2009/0134699 A1 May 28, 2009

(30) Foreign Application Priority Data
Nov. 23, 2007 (KR) .................. 10-2007-0119992

(51) Int. Cl.
*H04B 3/54* (2006.01)
(52) U.S. Cl. ............... 307/1; 307/3; 307/4; 340/310.12; 340/310.15
(58) Field of Classification Search ................... 307/1, 3, 307/4; 340/310.12, 310.15
See application file for complete search history.

(56) References Cited

U.S. PATENT DOCUMENTS

| | | | | | |
|---|---|---|---|---|---|
| 4,766,414 | A * | 8/1988 | Shuey | ............................ | 375/258 |
| 5,717,685 | A * | 2/1998 | Abraham | ....................... | 370/276 |
| 5,729,184 | A * | 3/1998 | Paxman et al. | ............... | 333/125 |
| 6,798,633 | B1 * | 9/2004 | Rossbach | ....................... | 361/152 |
| 7,795,994 | B2 * | 9/2010 | Radtke | .......................... | 333/100 |
| 7,876,174 | B2 * | 1/2011 | Radtke | .......................... | 333/100 |

FOREIGN PATENT DOCUMENTS
KR    1020010103971    11/2001

* cited by examiner

*Primary Examiner* — Jared J Fureman
*Assistant Examiner* — Hal I Kaplan
(74) *Attorney, Agent, or Firm* — Lerner, David, Littenberg, Krumholz & Mentlik, LLP

(57) ABSTRACT

A signal coupling apparatus for power line communications includes an impedance matching transformer and a transmission mode control circuit for high data rate power line communications on a three-phase four-wire distribution line. Therefore, it is possible to improve the efficiency of power line communications, to minimize signal loss, and to construct an optimal high voltage distribution path.

4 Claims, 7 Drawing Sheets

50Ω Transmission Trasnformer

253Ω Transmission Trasnformer

356Ω Transmission Trasnformer

450Ω Transmission Trasnformer

SIGNAL COUPLING APPARATUS FOR POWER LINE COMMUNICATIONS USING A THREE-PHASE FOUR-WIRE POWER LINE

CROSS-REFERENCE TO RELATED APPLICATION

This application claims the benefit of Korean Patent Application No. 10-2007-0119992 filed on Nov. 23, 2007 with the Korean Intellectual Property Office, the disclosure of which is incorporated herein by reference.

BACKGROUND OF THE INVENTION

1. Field of the Invention

The present invention relates to power line communications, and more particularly, to a signal coupling apparatus for power line communications using a three-phase four-wire power line.

2. Description of the Related Art

In general, power line communications are used to transmit communication signals, for example, digital data signals whose frequency is in the range from several hundreds of kHz to several dozens of MHz, over a power line or to a distribution line. In the power line communication technology, a communication signal transmitted through a power line is extracted by a high pass filter.

In particular, the power line communication technology is convenient and economical because it provides networking such as Internet connection through an existing power line without a separate communication line.

Meanwhile, since power lines are designed to supply power of 60 Hz, they have different electrical characteristics in a frequency band of 2 through 30 MHz, which is a frequency band for high data rate communications. Accordingly, when such power lines are used for communications, the power lines have many disadvantages, such as attenuation, noise, delay, etc.

In order to overcome such disadvantages, a signal coupling apparatus has been conventionally utilized between a plug connected to a power line and a communication plug connected to a terminal. A conventional signal coupling apparatus carries signals onto a power line or extracts signals from a power line using band-pass filtering or impedance matching.

However, since the conventional technique requires a separate impedance matching apparatus as well as the signal coupling apparatus for power line communications, there are difficulties in installation and management. In addition, a signal coupling apparatus is required to be designed in consideration of a three-phase four-wire distribution line.

Accordingly, studies on a signal coupling apparatus which can have simple structure, match an impedance of each of three-phase power lines, and control a transmission mode, without using a separate impedance matching apparatus, are underway.

SUMMARY OF THE INVENTION

The present invention is intended to solve the above-mentioned problems with the conventional signal coupling apparatus. One object of the present invention is to provide a signal coupling apparatus including an impedance-matching transformer and a transmission mode control circuit for high data rate power line communications on a high voltage distribution line, which can match an impedance of the high voltage distribution line and change transmission modes, thereby improving the efficiency of power line communications.

Another object of the present invention is to provide a signal coupling apparatus including an impedance-matching transformer and a transmission mode control circuit for high data rate power line communications on a high voltage distribution line, wherein the impedance-matching transformer includes at least two transformers connected in series and can match various impedances of high voltage power lines or distribution lines, thereby reducing signal loss.

Still another object of the present invention is to provide a signal coupling apparatus including an impedance-matching transformer and a transmission mode control circuit for high data rate power line communications on a high voltage distribution line, wherein the transmission mode control circuit provides various transmission modes, thereby enabling an optimal high voltage distribution path according to communication conditions.

According to an aspect of the present invention, there is provided a signal coupling apparatus for power line communications, which is used on a high voltage distribution line using a three-phase four-wire power line, including: a first signal coupler connected to a first-phase power line; a second signal coupler connected to a second-phase power line; a third signal coupler connected to a third-phase power line; a switching unit selectively connected to the first signal coupler, the second signal coupler, or the third signal coupler; and a control circuit outputting a switching control signal to electrically connect the switching unit to the first signal coupler, the second signal coupler or the third signal coupler.

Since the signal coupling apparatus according to the present invention includes an impedance-matching transformer to provide impedance-matching and a transmission mode control circuit to change transmission modes, the efficiency of power line communications can be improved.

Also, since the signal coupling apparatus according to the present invention can match various impedances of high voltage power lines or distribution lines, using at least two transformers, signal loss can be reduced.

Also, since the signal coupling apparatus according to the present invention can provide various transmission modes using a transmission mode control circuit, an optimal high voltage distribution path according to communication conditions can be obtained.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the aspects of the invention.

DETAILED DESCRIPTION OF EXEMPLARY EMBODIMENTS

Figure 1:
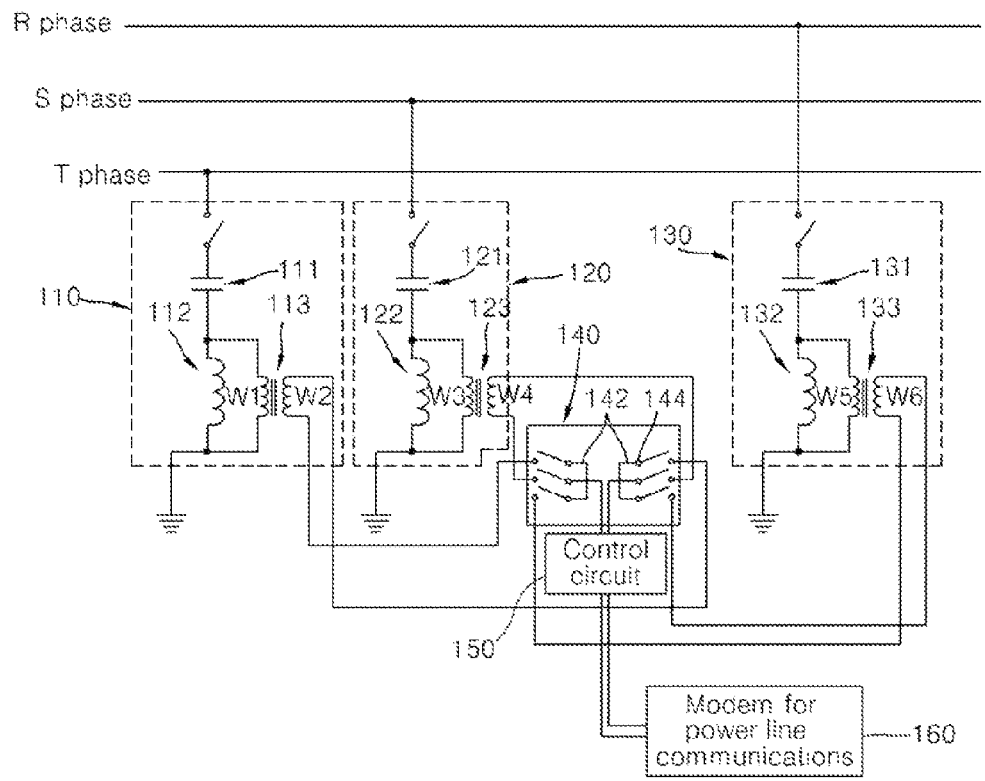
FIG. 1 is a circuit diagram of a signal coupling apparatus.

The invention is described more fully hereinafter with reference to the accompanying drawings, in which exemplary embodiments of the invention are shown. This invention may, however, be embodied in many different forms and should not be construed as limited to the exemplary embodiments set forth herein. Like reference numerals in the drawings denote like elements.

Hereinafter, a signal coupling apparatus including an impedance-matching transformer and a transmission mode control circuit for high data rate power line communications on a high voltage distribution line will be described in detail with reference to FIGS. 1 through 7.

In this specification, there is disclosed a new signal coupling apparatus for high data rate power line communications via a high voltage distribution line in a three-phase four-wire power line configuration. The signal coupling apparatus includes at least two transformers connected in series to match the impedance of a high voltage power line, and a control circuit for controlling a transmission mode to determine which power line among three-phase power lines communication signals are made to be carried through, thereby enabling an optimal high voltage distribution path. In the present invention, signal coupling can be carried out using Wire To Ground (WTG) or Wire To Wire (WTW).

FIG. 1 is a circuit diagram of a signal coupling apparatus for power line communications according to an embodiment.

The signal coupling apparatus illustrated in FIG. 1 is based on WTG. Referring to FIG. 1, the signal coupling apparatus includes a first signal coupler 110, a second signal coupler 120, a third signal coupler 130, a switching unit 140 and a control circuit 150.

The first signal coupler 110 is connected to a T-phase power line, and includes a coupling capacitor 111, a drain coil 112 connected in series to the coupling capacitor 111 and a transformer 113 connected in parallel to the drain coil 112. The primary winding W1 of the transformer 113 is connected to the drain coil 112, and the secondary winding W2 of the transformer 113 is connected to the switching unit 140.

The second signal coupler 120 is connected to an S-phase power line, and includes a coupling capacitor 121, a drain coil 122 connected in series to the coupling capacitor 121, and a transformer 123 connected in parallel to the drain coil 122. The primary winding W3 of the transformer 123 is connected to the drain coil 122, and the secondary winding W4 of the transformer 123 is connected to the switching unit 140.

The third signal coupler 130 is connected to an R-phase power line, and includes a coupling capacitor 131, a drain coil 132 connected in series to the coupling capacitor 121, and a transformer 133 connected in parallel to the drain coil 132. The primary winding W5 of the transformer 133 is connected to the drain coil 132, and the secondary winding W6 of the transformer 133 is connected to the switching unit 140.

The switching unit 140 is selectively connected to the first, second or third signal couplers 110, 120 or 130. The switching unit 140 and the control circuit 140 can be designed as a single unit. The switching unit 140 can include a relay 142 and a diode 144 for preventing counter electromotive current from being generated when a voltage is applied to the relay.

The control circuit 150 outputs a switching control signal for connecting the switching unit 140 to the first, second or third signal coupler 110, 120 or 130. Preferably, the control circuit 150 can have a function of selecting a transmission mode for receiving/transmitting communication signals from/to a modem 160 for power line communications. Here, the transmission mode determines which power line among three-phase four-wire power lines will be used as a signal line and which power line will be used as a return line. For example, according to the transmission mode, an R-phase power line can be a signal line and a T-phase power line can be a return line.

Various transmission line transformers having a wide bandwidth and excellent communication efficiency can be used as the transformers 113, 123, 133. Such various transmission line transformers will be described with reference to FIGS. 2 through 7, below.

Figure 2A:
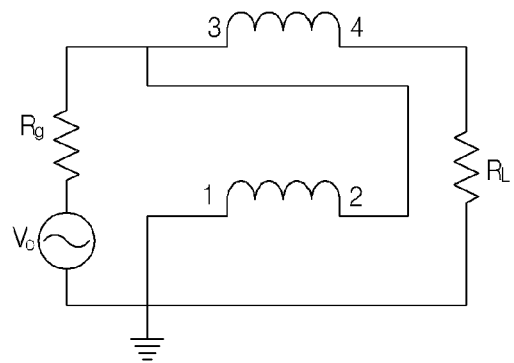
FIG. 2A is a circuit diagram of a 1:4 unbalanced to unbalanced (unun) transformer.
Figure 2B:
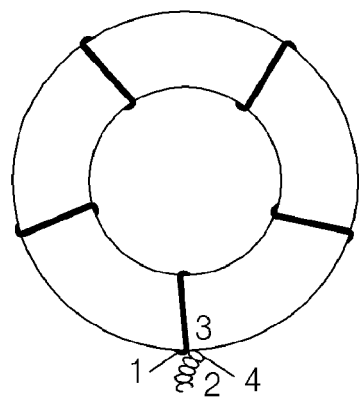
FIG. 2B shows a toroid core with twisted wires wound around it.

FIGS. 2A and 2B are views for explaining a 1:4 unbalanced to unbalanced (unun) transformer according to an embodiment, wherein FIG. 2A is a circuit diagram of the 1:4 unun transformer, and FIG. 2B shows a toroid core with twisted wires wound around it.

As illustrated in FIG. 2B, the 1:4 unun transformer can be made by winding bifilar twisted wires around the toroid core.

It is also possible to obtain a transformer with smaller impedance than a 1:4 unun transformer by using trifilar or quadrifilar twisted wires. A 1:2.25 unun transformer with trifilar twisted wires and a 1:1.78 unun transformer with quadrifilar twisted wires will be described with reference to FIGS. 3 and 4, below.

Figure 3:
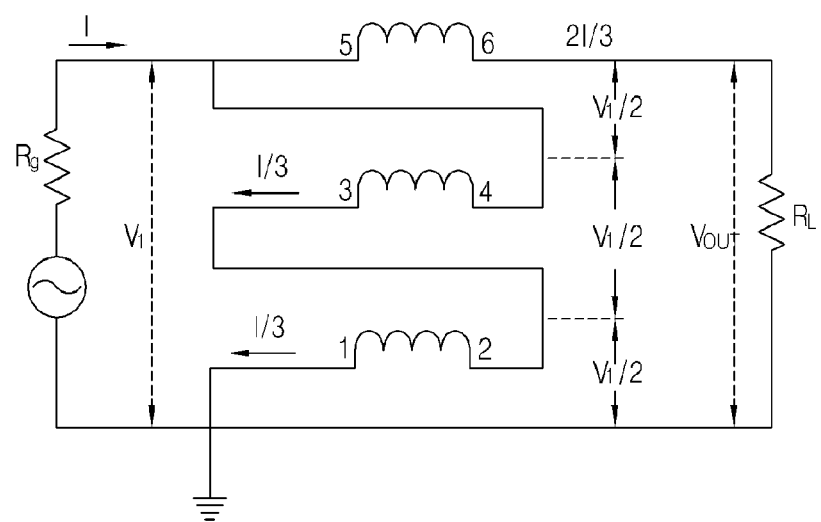
FIG. 3 is a view for explaining a 1:2.25 unun transformer.

FIG. 3 is a view for explaining a 1:2.25 unun transformer according to an embodiment.

As illustrated in FIG. 3, an output voltage $V_{out}$ can be represented as a sum of two voltages each being $$\frac{v_1}{2}$$

and a delay voltage $$\frac{v_1}{2},$$

and current flowing from a terminal 6 to a load can be represented by $$\frac{2I}{3}.$$

Therefore, a ratio of $R_L$ to $R_g$ can be expressed by Equation 1.

$$R_g = \frac{V_1}{I}, R_L = \frac{\frac{3V_1}{2}}{\frac{2I}{3}} = \frac{9V_1}{4I} = \frac{9}{4}R_g = 2.25R_g \tag{1}$$

Figure 4:
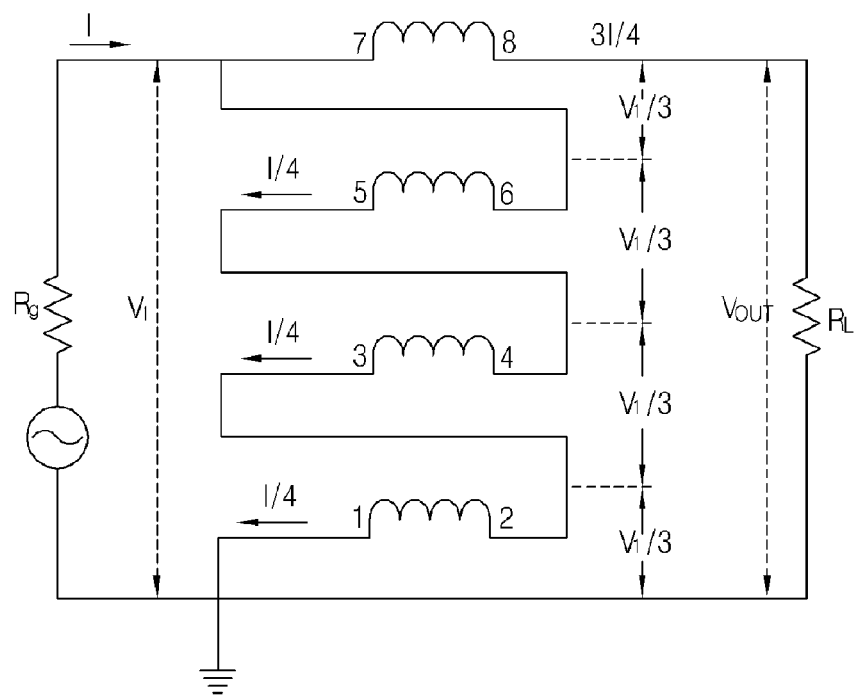
FIG. 4 is a view for explaining a 1:1.78 unun transformer.

FIG. 4 is a view for explaining a 1:1.78 unun transformer according to an embodiment.

As illustrated in FIG. 4, an output voltage $V_{out}$ can be represented as a sum of three voltages each being $$\frac{v_1}{3}$$

and a delay voltage $$\frac{v_1}{3},$$

and current flowing from a terminal 8 to a load can be represented by $$\frac{3I}{4}.$$

Therefore, a ratio of $R_L$ to $R_g$ can be expressed by Equation 2.

$$R_g = \frac{V_1}{I}, R_L = \frac{\frac{4V_1}{3}}{\frac{3I}{4}} = \frac{16V_1}{9I} = \frac{16}{9}R_g = 1.778R_g \tag{2}$$

Here, the more twisted wires are wound around the toroid core, the lower the impedance ratio is. In order to obtain an excellent frequency response in a high frequency range, a small size toroid core is advantageous. However, since it is very difficult to wind quadra- or more filar twisted wires around a toroid core over a predetermined number of turns, a transformer in an embodiment of the present invention can be made by connecting a 1:4 unun transformer, a 1:2.25 unun transformer, and a 1:1.78 transformer to one another in series.

Various transmission line transformers made by connecting the transformers to one another in series, which can transform an impedance, for example, to 50Ω, 112Ω, 253Ω, 356Ω or 450Ω, will be described with reference to FIGS. 5A through 5D, below.

FIGS. 5A through 5D shows the structures of various transmission-line transformers according to embodiments. As illustrated in FIGS. 5A through 5D, transformers which can transform an impedance to various values.

Figure 5A:
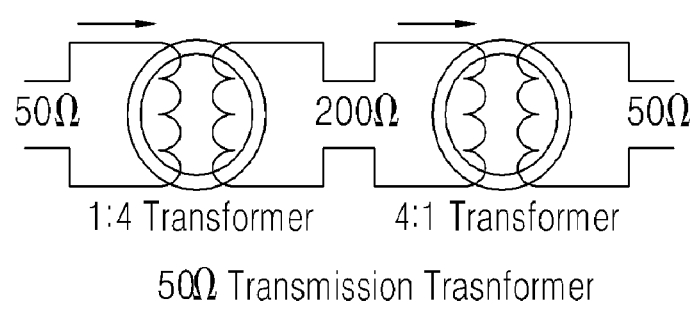
FIGS. 5A through 5D show the structures of various transmission-line transformers.

Referring to FIG. 5A, a 50-to-50 ohm transformer is constructed by connecting the output terminal 4 of the 1:4 unun transformer of FIG. 2 to the output terminal 4 of another 1:4 unun transformer.

Figure 5B:
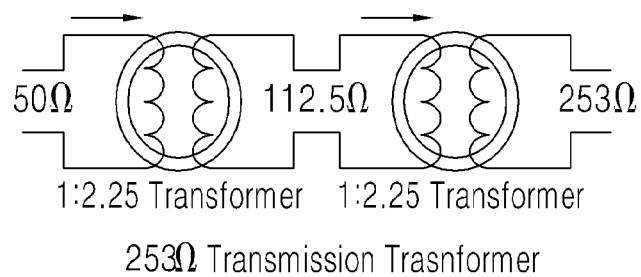

Referring to FIG. 5B, a 50-to-253 ohm transformer is constructed using the 1:2.25 unun transformer of FIG. 3. For example, the 50-to-253 ohm transformer is constructed by connecting the output terminal 6 of the 1:2.25 unun transformer to the input terminal 5 of another 1:2.25 unun transformer.

Figure 5C:
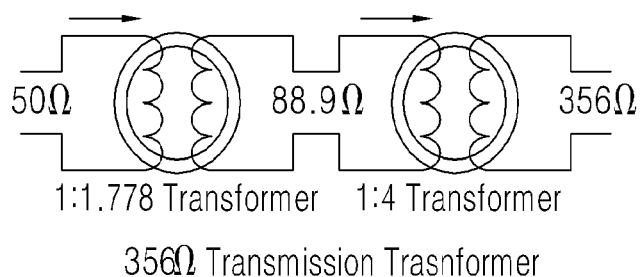
Figure 5D:
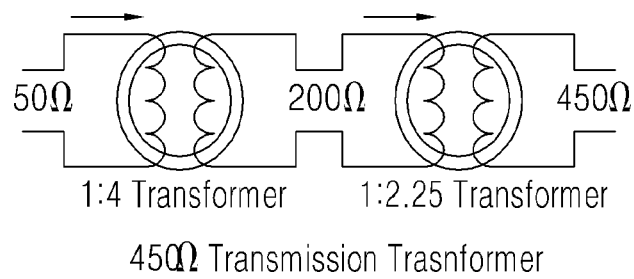

Referring to FIG. 5C, a 50-to-356 ohm transformer is constructed using the 1:1.778 unun transformer of FIG. 4 and the 1:4 unun transformer of FIG. 2. Also, referring to FIG. 5D, a 50-to-450 ohm transformer can be constructed using the 1:4 unun transformer of FIG. 2 and the 1:2.25 unun transformer of FIG. 3.

In order to determine whether the transmission line transformers constructed by connecting the transformers to one another in series operate correctly, a frequency response of each transformer is tested in a frequency band from 1 to 35 MHz. First, after a suitable load $R_L$ is connected to each transformer, input impedance $Z_{input}$ is tested. Second, transmission characteristics are tested through a back-to-back connection between transformers.

When the input impedance $Z_{input}$ is calculated by substituting the reflection characteristics $S_{11}$ of the transformer measured by a network analyzer into the following Equation 3, a frequency response of the transformer is high as the input impedance $Z_{input}$ approaches 50Ω in the frequency band from 1 to 35 MHz. That is, that input impedance $Z_{input}$ is 50Ω when an appropriate resistor or variable resistor is connected to the output terminal of a transformer means that impedance of the output terminal of the transformer are matched and as a result, no reflection to the input terminal of the transformer occurs.

$$Z_{input} = Z_O \frac{1+S_{11}}{1-S_{11}}, Z_0 = 50\Omega \tag{3}$$

Figure 6A:
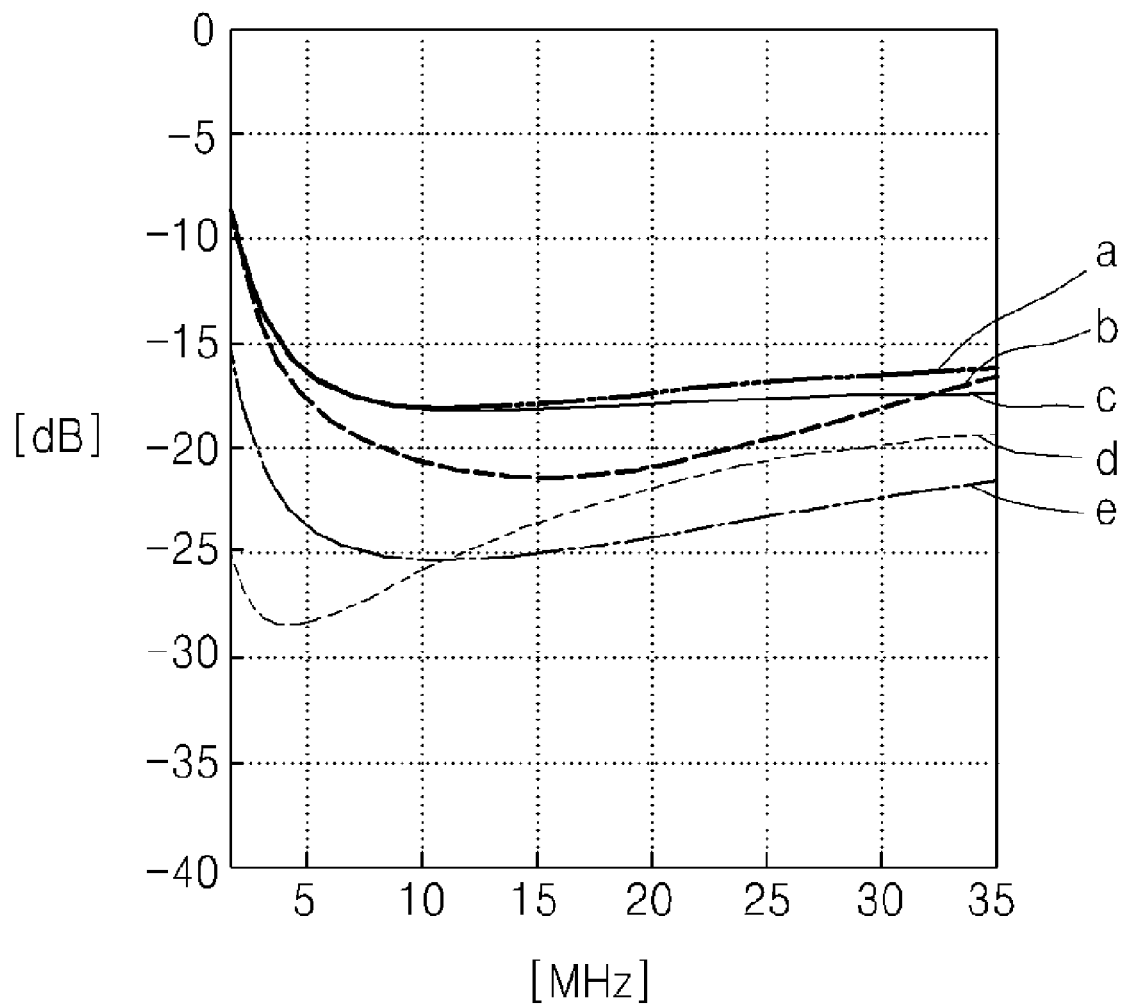
FIG. 6A is a graph showing reflection characteristics of transformers connected to different resistors, measured using a network analyzer.
Figure 6B:
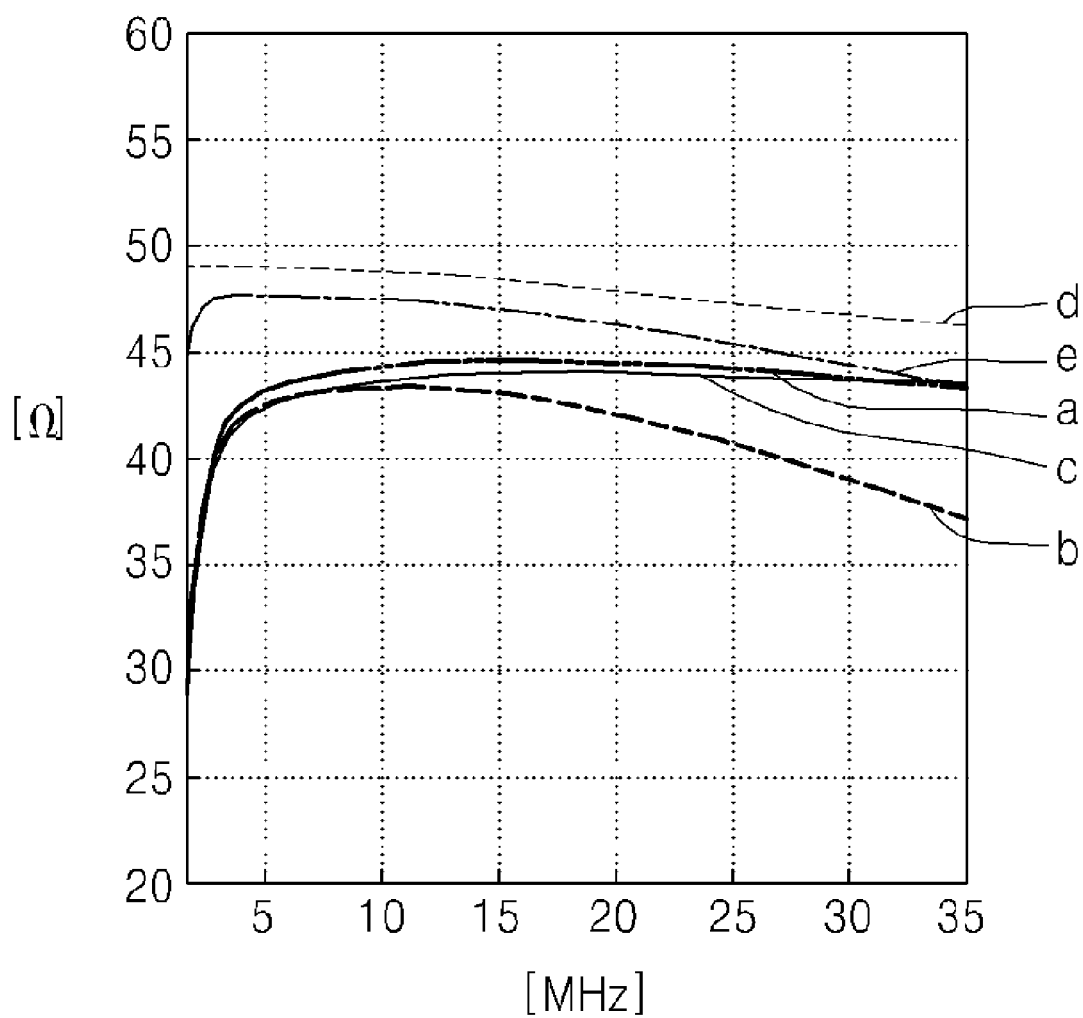
FIG. 6B is a graph showing input impedance calculated using the reflection characteristics of the transformers obtained in FIG. 6A.

FIGS. 6A and 6B show the measurement results of the impedance values of various transformers constructed by connecting transformers to one another in series. FIG. 6A is a graph showing the reflection characteristics $S_{11}$ of transformers connected to different resistors, measured using a network analyzer. FIG. 6B is a graph showing the impedance values $Z_{input}$ calculated using the reflection characteristics $S_{11}$ of the transformers in FIG. 6A.

FIG. 6A shows that the reflection characteristics $S_{11}$ of a 356Ω transformer (a), 450Ω transformer (b), 50Ω transformer (c), 112Ω transformer (d), and 253Ω transformer (e) have values smaller than 15 dB in a frequency band from 3 to 35 MHz. Accordingly, signals input to the 356Ω transformer (a), 450Ω transformer (b), 50Ω transformer (c), 112Ω transformer (d), and 253Ω transformer (e) are hardly reflected.

Meanwhile, in a frequency band from 1 to 3 MHz, the reflection characteristics $S_{11}$ of the 356Ω transformer (a), 450Ω transformer (b), and 50Ω transformer (c) have values more than 15 dB. This phenomenon seems to occur because a low frequency does not pass through a transmission line due to the inductance of the transmission line. Also, the reflection coefficients of the 356Ω transformer (a), 450Ω transformer (b), 50Ω transformer (c), 112Ω transformer (d), and 253Ω transformer (e) increase as a frequency increases, and this phenomenon also seems to occur because the inductance of the transmission line influences the frequency.

In FIG. 6B, the input impedances of the 356Ω transformer (a), 450Ω transformer (b), 50Ω transformer (c), 112Ω transformer (d), and 253Ω transformer (e) have values between 43Ω and 48Ω nearly all over the frequency band. This means that the input impedances have nearly correct values.

Figure 7:
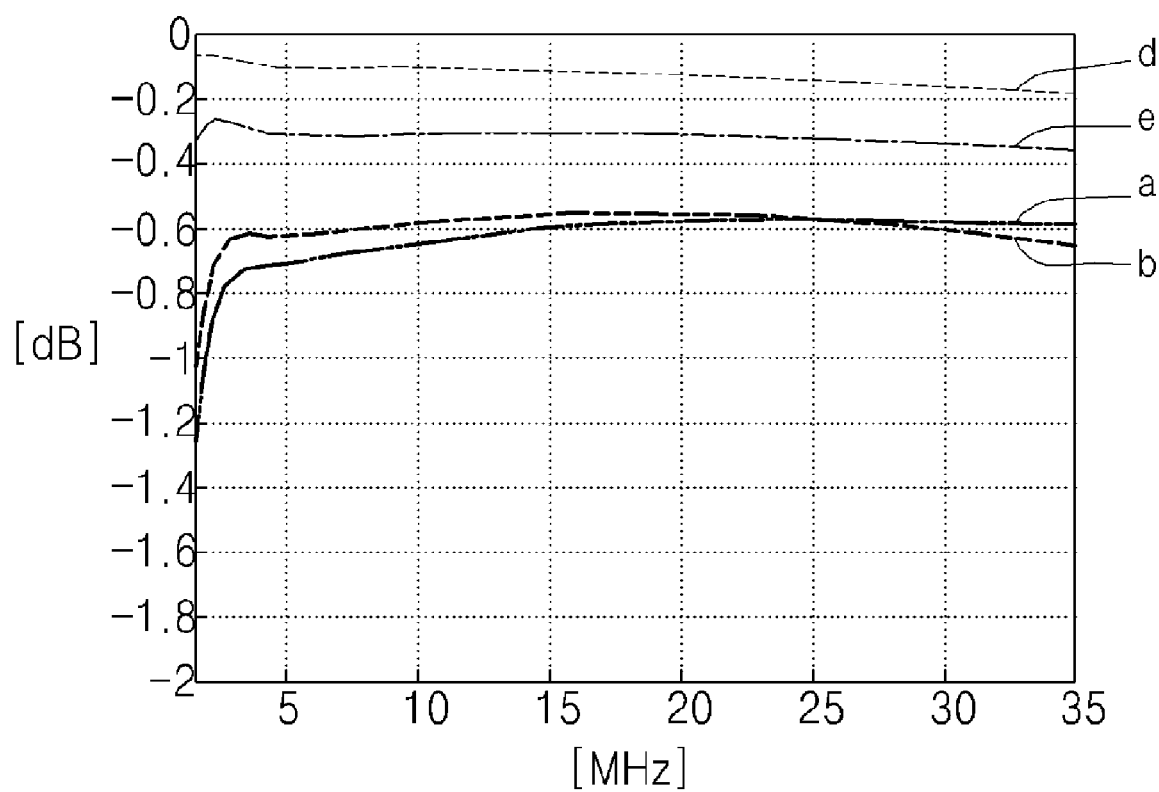
FIG. 7 is a graph showing transmission characteristics of transformers.

FIG. 7 is a graph showing the measurement results of the transmission characteristics of transformers.

As illustrated in FIG. 7, the transmission characteristics of the 356Ω transformer (a), 450Ω transformer (b), 112Ω transformer (d), and 253Ω transformer (e), measured by a network analyzer, have losses below 1 dB. Since the transmission loss in a back-to-back configuration is the loss in two transformers, the transmission characteristic in a single transformer is half as much as that in the back-to-back configuration. As a result, the transformer according to the present invention suffers little loss.

Since power line communications through a three-phase four-wire distribution line require long haul transmission, an optimal transmission mode as well as impedance matching for long haul transmission is also required. Table 1 shows various combinations of transmission modes that can be used in the control circuit (150 of FIG. 1) of the signal coupling apparatus for power line communications.

TABLE 1

| Channel | Transmission Mode | | |
|---|---|---|---|
| | Signal Path | Return Path | Method |
| Channel 01 | S, T | G | WTG |
| Channel 02 | R, T | G | WTG |
| Channel 03 | R, S | G | WTG |
| Channel 04 | S, T | R | WTW |
| Channel 05 | R, T | S | WTW |
| Channel 06 | R, S | T | WTW |
| Channel 07 | R | G | WTG |
| Channel 08 | S | G | WTG |
| Channel 09 | T | G | WTG |
| Channel 10 | R, S, T | G | WTG |
| Channel 11 | R | S | WTW |
| Channel 12 | R | T | WTW |
| Channel 13 | S | T | WTW |

Preferably, the control circuit (150 of FIG. 1) of the signal coupling apparatus for power line communications, according to the present invention, determines input impedance based on signals received from the first, second and third signal couplers (110, 120 and 130 of FIG. 1) through the switching unit (140 of FIG. 1), and selects a transmission mode according to the input impedance.

It will be apparent to those skilled in the art that various modifications and variations can be made in the present invention without departing from the spirit or scope of the invention. Thus, it is intended that the present invention covers the modifications and variations of this invention provided they come within the scope of the appended claims and their equivalents.

What is claimed is:

1. A signal coupling apparatus for power line communications using a three-phase four-wire power line, comprising:
    a first signal coupler connected to a first-phase power line;
    a second signal coupler connected to a second-phase power line;
    a third signal coupler connected to a third-phase power line;
    a switching unit selectively connected to the first signal coupler, the second signal coupler, or the third signal coupler; and
    a control circuit outputting a switching control signal to electrically connect the switching unit to the first signal coupler, the second signal coupler or the third signal coupler wherein the control circuit determines input impedance based on a signal received from the first signal coupler, the second signal coupler or the third signal coupler through the switching unit, and selects a transmission mode according to the input impedance.

2. The signal coupling apparatus of claim 1,
    wherein
    the first signal coupler comprises:
    a first coupling capacitor connected to the first-phase power line;
    a first drain coil connected in series to the first coupling capacitor; and a first transformer whose primary winding is connected to the first drain coil and whose secondary winding is connected to the switching unit,
    the second signal coupler comprises:
    a second coupling capacitor connected to the second-phase power line;
    a second drain coil connected in series to the second coupling capacitor; and
    a second transformer whose primary winding is connected to the second drain coil and whose secondary winding is connected to the switching unit, and
    the third signal coupler comprises:
    a third coupling capacitor connected to the third-phase power line;
    a third drain coil connected in series to the third coupling capacitor; and
    a third transformer whose primary winding is connected to the third drain coil and whose secondary winding is connected to the switching unit.

3. The signal coupling apparatus of claim 2, wherein each of the first transformer, the second transformer, and the third transformer has at least two ruthroff transmission line transformers which are connected in series.

4. The signal coupling apparatus of claim 1,
    wherein the switching unit comprises:
    a relay; and
    a diode preventing a counter electromotive current from being generated when a supply voltage is applied to the relay.

* * * * *